Aug. 24, 1965 R. L. LE CLEAR 3,201,814
HYDRAULICALLY ACTUATED DOCK BOARD WITH HINGED LIP
Filed Aug. 5, 1963 7 Sheets-Sheet 2

FIG 2

INVENTOR
Robert L. LeClear
BY Jacobi & Davidson
ATTORNEYS

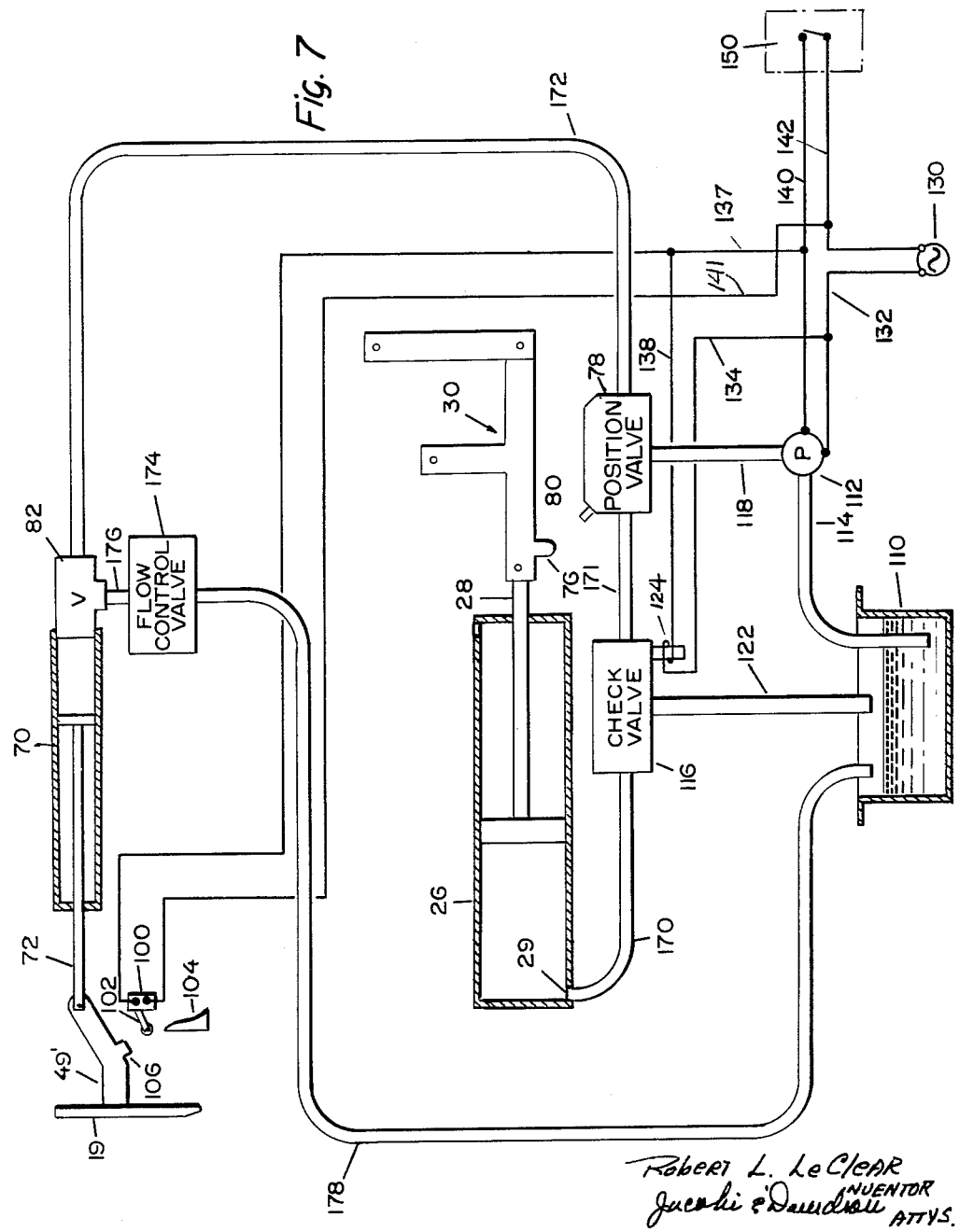

United States Patent Office 3,201,814
Patented Aug. 24, 1965

1

3,201,814
HYDRAULICALLY ACTUATED DOCK BOARD
WITH HINGED LIP
Robert L. Le Clear, Albion, Mich., assignor to T & S
Equipment Co., Albion, Mich., a corporation of
Michigan
Filed Aug. 5, 1963, Ser. No. 299,829
9 Claims. (Cl. 14—71)

This application is a continuation-in-part of my copending application Serial No. 257,124, filed February 8, 1963.

This invention relates to vehicle loading and unloading equipment, and more particularly to a hydraulically actuated dock board having a hinged lip, which dock board is of the type adapted to be installed at a loading platform to facilitate the loading or unloading of vehicles positioned adjacent the loading platform.

Heretofore, numerous types of dock boards have been proposed and utilized, and many of these dock boards were relatively complex in construction, including both manual and power operated models, and in many cases including a carriage on which a ramp was pivotally mounted, together with means to move the carriage forward or rearwardly to position the ramp of the dock board above the body of a vehicle or to retract the same therefrom. These prior dock boards while comparatively satisfactory in operation, are relatively costly, and, furthermore, require considerable maintenance, thereby increasing the over-all cost.

It is accordingly an object of the invention to provide a hydraulically actuated dock board having a hinged lip on the forward end of the dock board ramp, and which may be conveniently installed in a recess in a loading platform, or on a frame forward of the platform, to facilitate the loading or unloading of vehicles.

A further object of the invention is the provision of a hydraulically actuated dock board having a hinged lip on the forward end of the ramp, and in which the lip is automatically raised, and in which the lip moves downwardly under the action of gravity at a relatively slow speed during downward movement of the ramp.

A still further object of the invention is the provision of a hydraulically actuated dock board having a hinged lip on the forward end of the ramp, and in which the hydraulic actuating means precludes the necessity for providing a counterbalancing means.

Another object of the invention is the provision of a hydraulically actuated dock board having a hinged lip on the forward end of the ramp, and in which such lip, when in vertical position, provides means for supporting the ramp in horizontal position in alignment with the upper surface of the loading platform to permit cross traffic over the dock board.

A further object of the invention is the provision of a hydraulically actuated dock board having a hinged lip on the forward end of the ramp, and in which such lip, when in vertical inoperative position, together with a portion of the frame on which the dock board is mounted, provides a closure for the forward end of the dock board structure between the upper surface of the ramp and the lower surface of the recess in the loading platform in which the dock board is installed.

A still further object of the invention is the provision of a hydraulically actuated dock board having a hinged lip on the forward end of the ramp and in which the entire operation of the dock board, ramp and lip may be controlled by a single control system.

While the above stated objects are applicable generically to differing embodiments of the invention presented herein, certain embodiments of the invention have objects specific thereto.

Thus, in accordance with one embodiment of the present invention, it is an object of the invention to provide a control system which yields an automatic elevating operation of the hinged lip of the dock board assembly during upward movement of the ramp of such assembly. Consistent with this object, still further objects of the invention in this regard include: (a) the provision of a mechanical link, preferably in the form of a flexible cable, which cooperates with the pivotally mounted lip to extend the same once the dock board platform or ramp has reached a given elevation and is traveling upwardly therefrom; (b) the provision of such a dock board construction wherein the ramp is elevated by a hydraulic means, preferably in the form of a piston and cylinder which applies a lifting force to the dock board through an elevating linkage including a rocker arm assembly; (c) the provision of such a dock board construction wherein the piston and cylinder are pivotally mounted with respect to the dock board frame so that generally horizontal outward movement of the piston with respect to the cylinder imparts the lifting acion to the cooperating components; and (d) the provision of such a dock board construction which can be manufactured comparatively inexpensively for trouble-free operation over extended periods of time.

While the embodiment of the invention to which the immediately preceding objects are specifically directed is important, another embodiment of the invention assumes major importance wherein automatic return operation of the platform or ramp is desired. More particularly, consistent with a further embodiment of the invention, the dock board provided hereby automatically returns to its initial position once no further use thereof is desired, as, for example, once a loaded or unloaded vehicle moves away from a loading platform with which the dock board is associated.

As well known to those skilled in the art, in the normal use of a hinged lip dock board, a vehicle to be unloaded backs-up adjacent the loading ramp with which the dock board is associated. Then the ramp is elevated, and the lip is extended, and the ramp and lip descend until the lip engages the vehicle or carrier bed, whereupon the lip and ramp together provide a continuous unloading ramp. The ramp may slope upwardly from the platform onto the vehicle, or downwardly from the platform onto the vehicle or may be disposed in some position therebetween during an unloading operation or a loading operation, the ramp and lip assembly assumes such a given position, and no further control is necessary.

However, with the normal dock board system, once the dock board has assumed its operating position, if the vehicle should pull forward of the ramp or platform with which the dock board is associated, then the dock board ramp and lip would automatically descend to their lowermost position. This position would be below the level of the loading platform, and accordingly, the dock board ramp or platform would not be in horizontal alignment with the loading platform so as to permit cross traffic thereon. Moreover, if some lock is provided to maintain the dock board platform in its operating position during a loading and unloading operation, then if the vehicle should pull away from the loading platform, the dock board remains in its operating position, also not permitting cross traffic on the platform.

In contrast with prior constructions, and consistent with the present invention, means are provided for automatically causing the dock board to return to its initial position, i.e., the horizontal position should a truck pull away from the ramp or loading platform. Specifically in this regard, it is an object of the present invention to provide a dock board of the type having a hinged lip at the forward end thereof, wherein the dock board ramp initially raises, then the dock board lip extends, wherein the dock board ramp and lip then descend to an operating position with the lip in engagement with the vehicle. Should the vehicle pull away, the dock board ramp and lip further descend to a lowermost position whereupon automatic control means are activated to return the dock board ramp and hinged lip to their initial position with the dock board ramp in horizontal alignment with the loading platform.

In a more generic sense, it is an object of the present invention to provide an improved hinged lip dock board construction which features an automatic resetting of the dock board assembly components to their initial or normal positions in the event a vehicle being loaded or unloaded no longer supports the dock board ramp components in operating position. Consistent with this object, more specific objects hereof include the following: (a) the provision of such a dock board assembly in which both the dock board ramp and the hinged lip are operated hydraulically; (b) the provision of such a dock board assembly which incorporates control means responsive to the position of the dock board elements to automatically and sequentially operate the hydraulic means of the dock board first to raise the dock board platform and then the lip, and secondly to restore the dock board platform and lip to their initial position in the event a vehicle pulls away from the assembly; (c) the provision of such a dock board assembly wherein the control means comprises valves means and switching means activated by mechanical control members disposed to render the switching means and valve means responsive to dock board platform and lip positions; and (d) the provision of such a dock board assembly which provides for the aforesaid automatic reset operation, and which additionally is so constructed as to operate for extended periods of time free of component failure.

Auxiliary to the above objects, but not of lesser significance, is the fact that the invention provides an automatic control arrangement which permits the selective operation in proper sequential movements of first and second hydraulic means which serve respectively to elevate the dock board platform and extend the dock board lip whereby, as elevated and extended, the platform and lip respectively can descend under gravitational forces to their operative positions.

The invention lies in the combination arrangement and disposition of certain means and elements. The same will be better understood, and objects other than those specifically set forth above, will become apparent when consideration is given to the following detailed description of illustrative and preferred embodiments hereof. Such embodiments are shown in the annexed drawings, wherein:

FIGURE 2 is a vertical sectional view of the dock board shown in FIGURE 1 but with the parts thereof in the positions which they assume when the dock board ramp has been elevated and the hinged lip has been extended;

Figure 4:
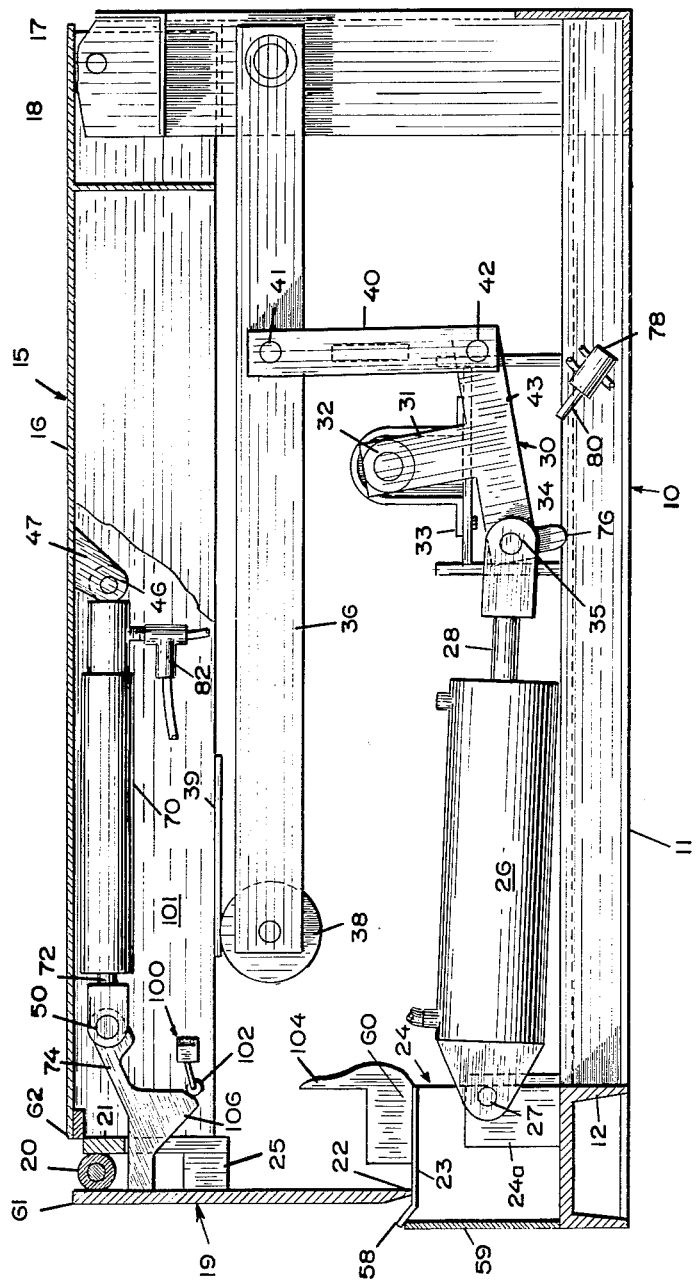
FIGURE 4 is a vertical sectional view of a preferred embodiment of the dock board assembly provided in accordance with the present invention which is operable to automatically reset itself to normal horizontal cross traffic position, FIGURE 4 showing the various parts of the assembly in the positions which they assume when the ramp thereof is in the horizontal cross traffic position.
Figure 5:
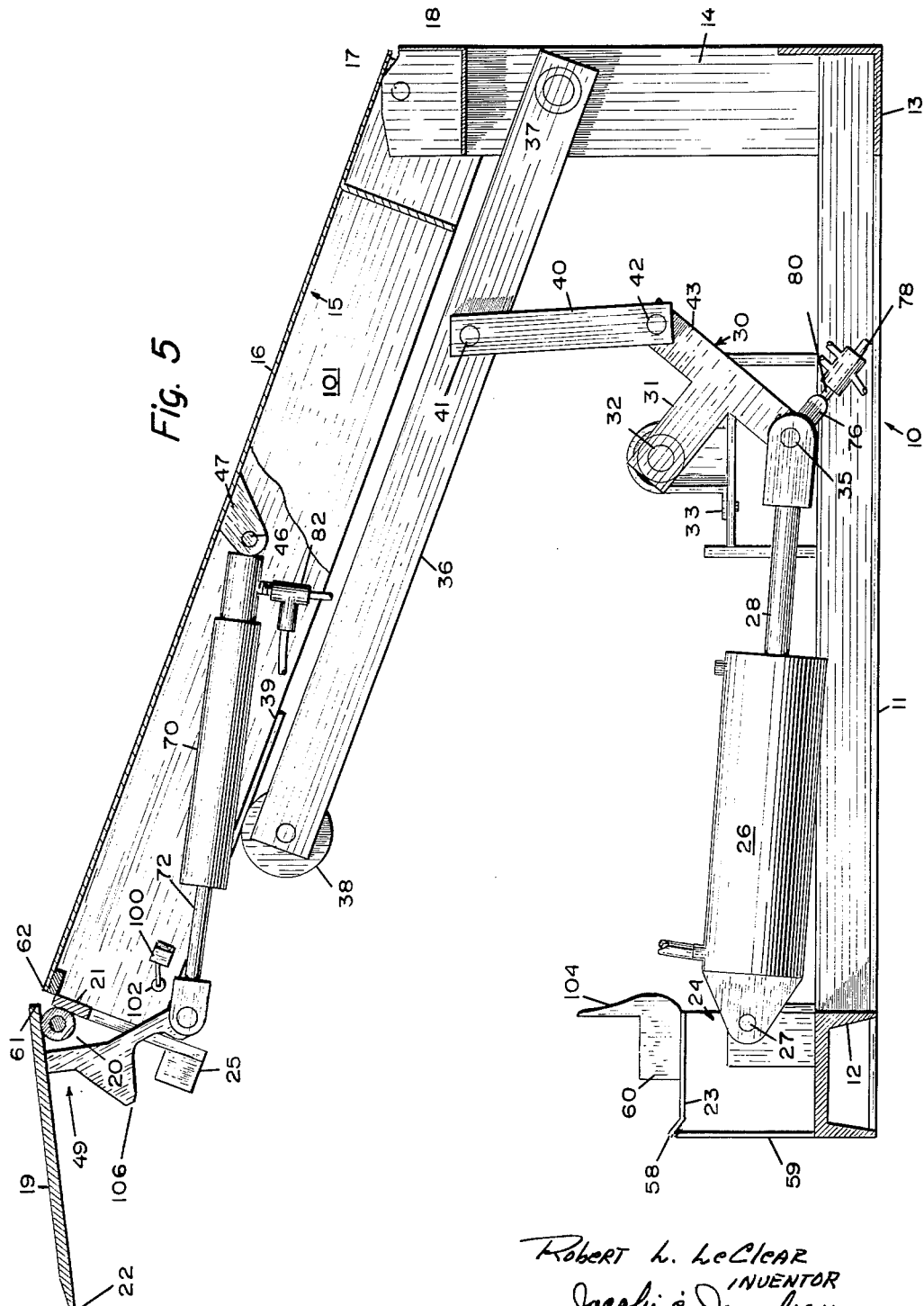
FIGURE 5 is a vertical cross sectional view of the dock board shown in FIGURE 4, but with the parts assuming the positions which they occupy when the dock board ramp and dock board lip are respectively elevated and extended.
Figure 6:
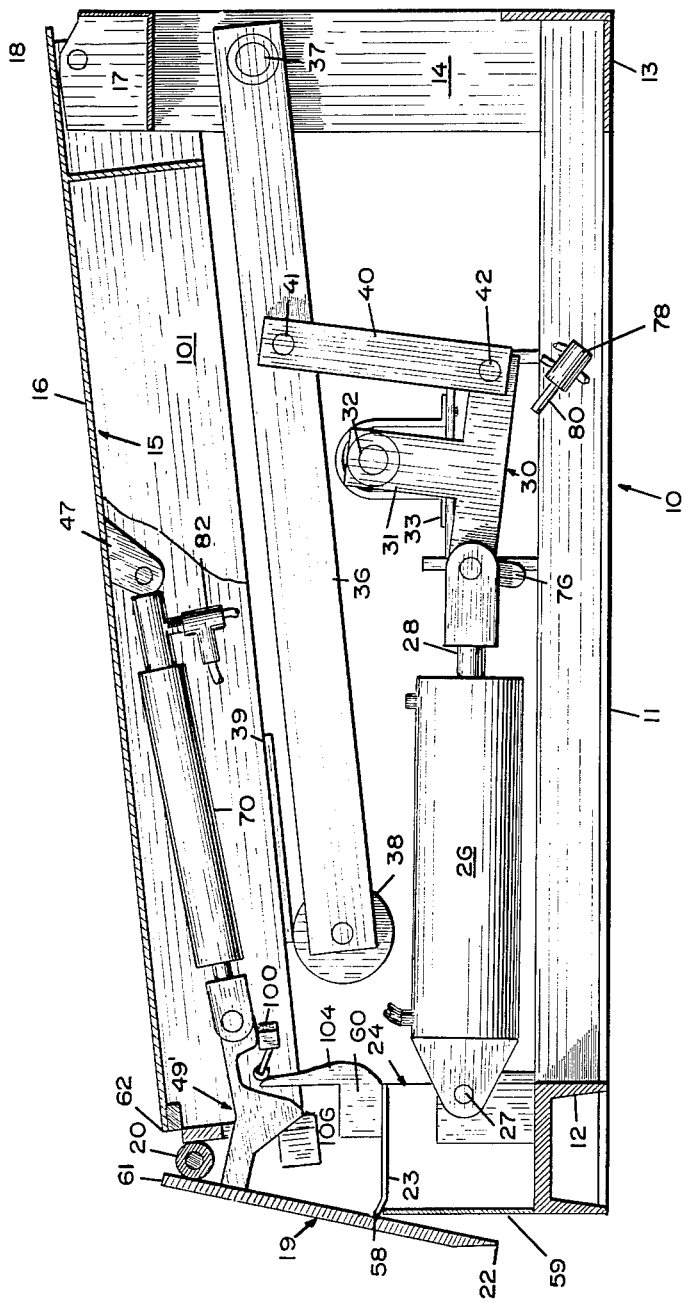

FIGURE 6 is a vertical sectional view of the dock board assembly shown in FIGURES 4 and 5, but with the parts thereof in the positions which they assume when the dock board ramp has descended to its lowermost position and the assembly is about to start a reset cycle; and FIGURE 7 is a schematic flow diagram of the hydraulic operating system and electrical controls incorporated in the dock board assembly shown in FIGURES 4 through 6.

Figure 1:
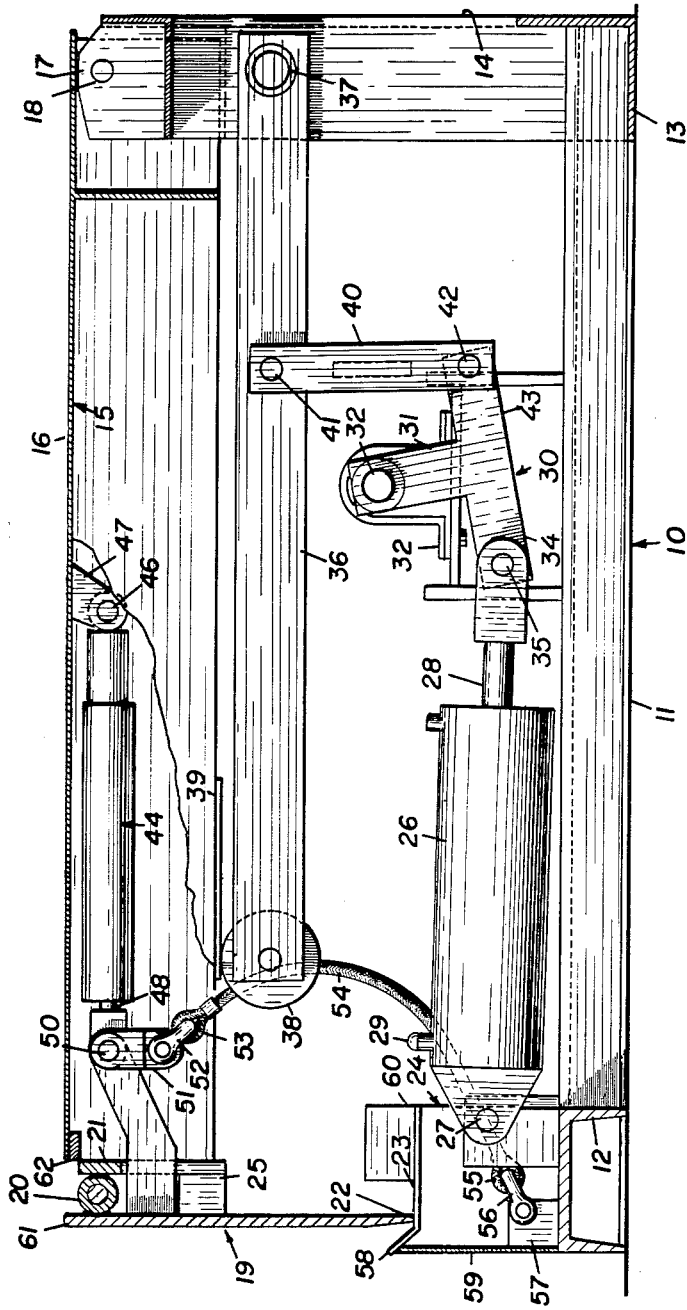
FIGURE 1 is a vertical sectional view of a dock board constructed in accordance with one embodiment of the present invention, FIGURE 1 showing the parts of the dock board assembly when the ramp thereof is in the horizontal or cross traffic position.
Figure 3:
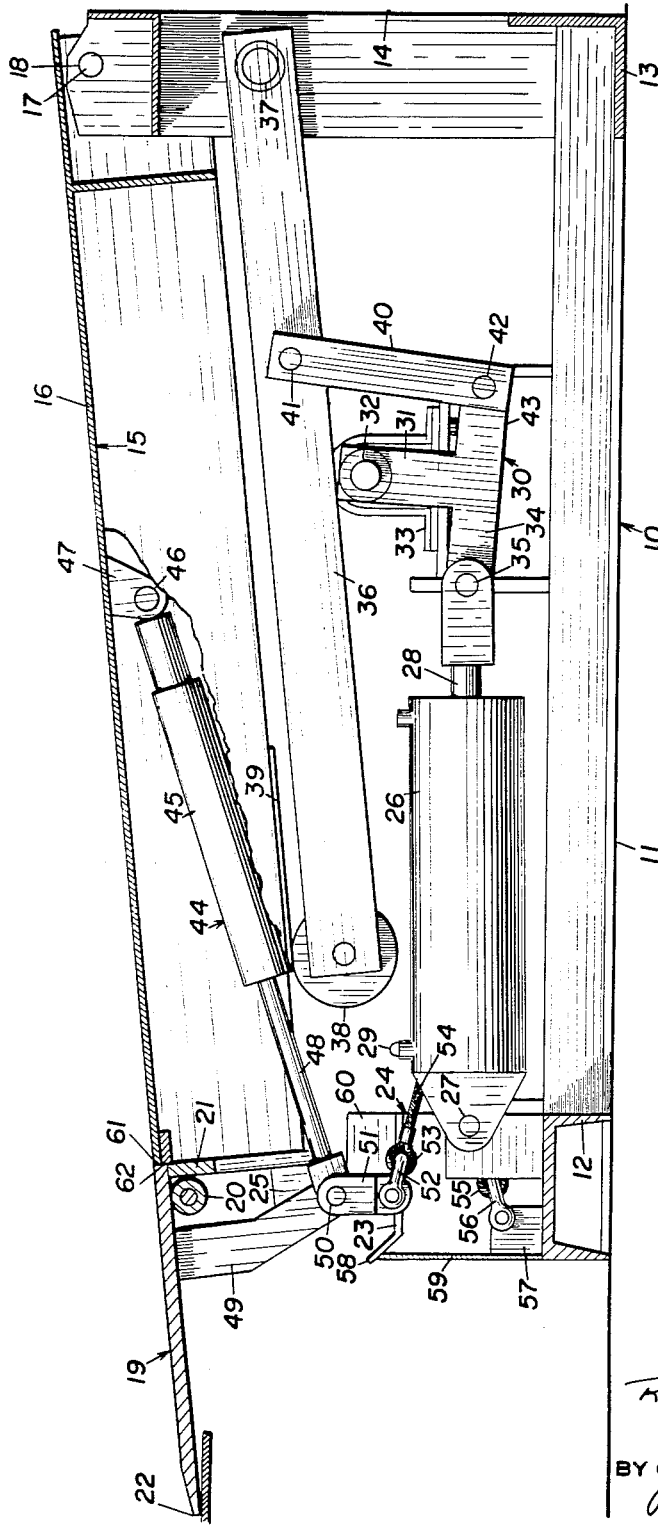
FIGURE 3 is a vertical sectional view of the dock board shown in FIGURES 1 and 2, but with the parts thereof in the positions which they have assumed when the dock board ramp and lip have assumed an operating position with respect to a carrier bed of a vehicle.

Before referring more specifically to the drawings, it should be noted that certain features are common to respective embodiments of the invention. Under these circumstances, and for convenience in description, the embodiment of FIGURES 1 through 3 is described initially, and then the embodiment of FIGURES 4 through 6 is discussed. In general, there are two basic differences between the respective embodiments. More particularly, in the embodiment of FIGURES 1 through 3, the lip of the dock board is raised through a mechanical action, whereas in the embodiment of FIGURES 4 through 6, the lip of the dock board is hydraulically raised. Moreover, the embodiment of FIGURES 4 through 6 provides an automatic reset operation whereby the assembly returns to its normal cross traffic position, whereas with the embodiment of FIGURES 1 through 3, an operator must perform the reset sequence.

Bearing such facts in mind, reference will now be made initially to the basic embodiments of the invention.

*Embodiment of FIGURES 1 through 3*

With continued reference to the drawings, there is shown in FIGURES 1–3, a hydraulically actuated dock board constructed in accordance with the present invention. Such dock board comprises a generally rectangular frame 10 including side members 11, a front cross member 12, and a rear cross member 13. Extending upwardly from the rear cross member 13 is a ramp-mounting member 14.

A generally rectangular ramp 15 having an upper load-supporting surface 16 is pivotally mounted adjacent its rear end by a pivot pin 17 received in aligned apertures 18 in the upper end of the ramp supporting member 14. For purposes of description, it is to be understood that the words ramp and platform are used interchangeably and are consistent with one another. A generally rectangular lip 19 is hingedly mounted adjacent its rear edge thereof by hinge means 20 on the forward end 21 of the ramp 15. The lip 19 normally occupies the vertical position shown in FIGURE 1, and in this position the lower end 22 of the lip 19 engages the upper surface 23 of the support 24 extending upwardly from the forward cross member 12 of the frame 10. The outer or lower end 22 of the lip 19 in engagement with the upper surface 23 of the support 24, as shown in FIGURE 1, serves to maintain the ramp 15 in a horizontal or cross traffic position in alignment with the upper surface of the loading platform in which the dock board is installed.

Suitable abutment means 25 is provided on the forward end 21 of the ramp 15 for engaging the lip 19 to prevent movement thereof beyond the vertical position, as clearly shown in FIGURE 1.

A hydraulic cylinder 26 is pivotally mounted at 27 to a bracket 24a forming part of support 24. The hydraulic cylinder 26 is provided with a piston rod 28 and a fluid pressure connection 29. A generally T-shaped rocker arm 30 is provided with an arm 31 pivotally mounted at 32 on a bracket 33 secured to the frame 10, and an arm 34 of the rocker arm 30 is pivotally connected at 35 to the piston rod 28 of the hydraulic cylinder 26.

A ramp elevating bar 36 is pivotally mounted at 37 adjacent its rear end on the ramp mounting member 14 extending upwardly from the frame 10, and the forward end of the ramp raising bar 36 is provided with a rotatably mounted roller 38 which engages a lower surface 39 on the ramp 15. One end of a link 40 is pivotally connected at 41 to the ramp raising bar 36, and the opposite end of the link 40 is pivotally connected at 42 to another arm 43 of the rocker arm 30.

A dash pot 44 is provided with a cylinder 45 pivotally connected at 46 to a bracket 47 extending downwardly from the ramp 15, and the cylinder 45 of the dash pot 44 is provided with a piston rod 48 projecting from the forward end thereof. Actuating arm 49 is fixed to the lip 19 and extends rearwardly, and the actuating arm 49 is pivotally connected by a pivot pin 50 to the piston rod 48 of the dash pot 44. Also pivotally connected to the pivot pin 50 is a clevis 51, which in turn is connected by means of a shackle 52 to one end 53 of a cable or other flexible member 54. The cable or flexible member 54 is of a predetermined length, and the opposite end 55 thereof is connected by means of a shackle 56 to a suitable bracket 57 extending upwardly from the front cross member 12 of the frame 10.

The upper surface 23 of the support 24 is provided adjacent the forward edge thereof with an upwardly inclined flange 58. A closure plate 59 extends downwardly from the flange 58 to the upper surface of the front cross member 12 of the frame 10. Such plate, together with the lip 19 in the vertical position shown in FIGURE 1, provides a complete closure for the forward end of the dock board structure when the ramp 15 is in the horizontal position, as shown in FIGURE 1. Also provided on the upper surface 23 of the support 24 are one or more blocks 60, the purpose of which will be later described.

When it is desired to operate the dock board, it is only necessary to introduce hydraulic fluid from a suitable source of such fluid under pressure through the inlet connection 29 to the hydraulic cylinder 26, thereby resulting in forcing the piston rod 28 rearwardly, to the right as shown in FIGURE 1, to move the rocker arm 30 in a counter-clockwise direction about the pivot point 32 thereof. Such movement serves to raise the link 40 and pivot the ramp-elevating bar 36, which, by reason of engagement of the roller 38 with the lower surface 39 of the ramp 15 raises such ramp about the pivot pin 17 to any desired elevated position. Sufficient upward movement of the ramp 15 serves to remove the slack from the cable or flexible element 54, and at such time, the cable 54 will serve to pull the pivot pin 50 downwardly with respect to the ramp 15. This movement is permitted by reason of the pivotal mounting of the dash pot 44 and the hinge mounting of the lip 19. Such downward movement of the pivot pin 50 also causes downward movement of the rear end of the lip-actuating arm 49, which serves to pivot the lip 19 upwardly about the hinge 20 toward a generally horizontal position in alignment with the upper surface 16 of the ramp 15. As explained below, ultimate movement of the ramp 15 will result in engaging the inner edge 61 of the lip 19 in a recess 62 at the forward end of the ramp 15, at which time the lip 19 is in alignment with the upper surface 16 of the ramp 15.

At the time the lip is extended, a truck or other vehicle, as shown in FIGURE 2, has moved into position adjacent the forward end of the dock board. Upon release of fluid pressure from the hydraulic cylinder 26, the ramp 15 will move downwardly under the action of gravity, and since this downward movement releases the tension in the flexible element or cable 54, the lip 19 will also start to move downwardly under the action of gravity, but such downward movement is at a relatively slow rate, and is controlled by the action of the dash pot 44. It is to be noted that outward movement of the piston rod 48 of the dash pot 44 during upward movement of the lip 19 is substantially free while inward movement of the piston rod 48 is controlled by the structure of the dash pot 44, which, as conventional, permits a slow inward movement of the piston rod 48. The ramp 15 and lip 19 continue to move downwardly until such time as the forward edge 22 of the lip 19 engages the load bed of the body of the truck or other vehicle, at which time the rear edge 61 of the lip 19 will engage in the recess 62 in the forward end of the ramp 15, and further downward movement of the ramp 15 and lip 19 will be prevented, and the vehicle may be unloaded or loaded over the upper surface 16 of the ramp 15.

After the particular vehicle has been loaded or unloaded over the ramp and extended lip, as desired, then the lip and ramp or platform can be manipulated to various positions, and/or will automatically assume certain positions.

For example, once the loading operation has been completed, the ramp 15 may again be raised by the application of fluid pressure to the hydraulic cylinder 26. This will result in raising the ramp 15 to its uppermost position, if desired, and at this time, the lip can swing to its initial vertical position. Even if the vehicle previously being loaded remains at the ramp, once the fluid pressure is permitted to drain from the hydraulic cylinder 26 following the raising thereof as immediately described above, the ramp or platform 15 will begin to descend, under gravitational action, and will continue such descension until the lower edge 22 of the lip 19 engages the support surface 23 of the support 24.

Alternatively, the operator may, if the vehicle having been loaded or unloaded is about to move away, direct only sufficient fluid into the hydraulic cylinder 26 to raise the same to a point where the lip is free of the vehicle bed. Then, the vehicle would move away, and the operator need only raise the ramp until such time as the lip is free to assume a vertical position whereupon the fluid pressure can be released and the ramp and lip will descend so that the lip maintains the ramp in its normal horizontal position. In this particular alternative, it may not be necessary to raise the ramp as high as when the vehicle remains in its position adjacent the platform and the ramp is to be reset to its original cross traffic position.

In addition to the above alternatives for resetting the ramp, and as will be appreciated by those familiar with the art, it is possible that the operator of the vehicle being loaded or unloaded may drive the vehicle away from the loading platform forgetting to operate the dock board assembly prior to removal of the dock board from engagement therewith. In this instance, the supporting surface shown in FIGURE 3 would be pulled out from under the lip 19, and as a result, the ramp 15 and the lip 19 would descend to the lowermost position. The ultimate result would be that the lip 19 assumes a generally vertical position with the lower portion thereof extending in front of the cover plate 59. Of course, the ramp 15 descends also, and eventually the shackle 51 engages the support surface 23 of the support 24. In this position, the ramp 15 is below the horizontal level, and there is essentially a gap in the loading platform with which the dock board assembly is associated. However, the operator can restore the dock board assembly to its initial condition by causing fluid under pressure to enter the cylinder 26, whereupon the platform is raised until such point as the lip 19 assumes its vertical position, whereupon the operator releases the fluid from the cylinder 26 and the dock board and lip descend to their respective normal positions, as shown in FIGURE 1.

It is to be noted that in the event the lip 19 has not moved to a completely vertical position when the outer edge 22 thereof approaches the support 24, the outer edge 22 of the lip 19 may engage the inclined surface 58 on the platform 24, thereby causing movement of the lip 19 to the vertical position in engagement with the abutments 25 on the ramp 15.

It will thus be seen that by the above-described invention, there has been provided an extremely simple dock board which is hydraulically operated, and may be controlled in all its movements by a single control means for the single hydraulic operating cylinder, which dock board is firmly supported in a horizontal inoperative position to permit cross traffic thereover, and which may be conveniently operated to engage the body of a vehicle, regardless of the height thereof, within the limits of movement of the dock board ramp. It is likewise to be noted that by reason of the use of the hydraulic operating mechanism, no counterbalancing means is necessary, thereby materially reducing the cost of the dock board, and in view of the simplicity of construction, maintenance is reduced to a minimum.

Embodiment of FIGURES 4 through 7

As will become apparent from the following description, the embodiment of FIGURES 4 through 7 provides for an automatic reset of the dock board components to their normal cross traffic position should a vehicle supporting a ram and lip in operative position move away from the dock board assembly. To this end, the flexible cable 54 and components associated therewith for attaching the same between the bracket 57 and lip operating arm 49 are eliminated. Moreover, the dash pot 44 is replaced with a hydraulic cylinder 70 and piston rod 72.

Aside from the provision of certain control elements, however, and the specific differences noted above, the structural arrangement of the embodiment now under consideration is virtually identical to the structural arrangement of the embodiment initially described above in reference to FIGURES 1 through 3. To raise the ramp 15 to an elevated position, fluid under pressure is fed to the hydraulic cylinder 26 and this in turn causes counter-clockwise rotation of the rocker arm 31 and pivoting of the ramp lifting arm 36. In turn, through the cooperation of the roller 38 with the lower surface 39 of the ramp, the ramp is raised to an elevated position.

It will be recalled that in the previously described embodiment as the ramp 15 approached its uppermost position, the cable 54 became taut, and as a result, the operating arm 49 was pulled downwardly, thereby rotating the lip 19 upwardly. In the embodiment of FIGURES 4 through 6, the upward movement of the lip results from introducing fluid under pressure within the cylinder 70 and in turn causing the piston rod 72 to move outwardly as shown, thereby raising the lip 19 to an extended position, as shown in FIGURE 5. The cylinder 70, and piston 72 are associated, respectively, with the bracket 47 and the operating arm 49' shown in FIGURES 4 through 6, in the same manner that the dash pot 44 and piston rod 48 thereof were respectively associated with the bracket 47 and operating arm 49 of the previously described embodiment. However, since fluid under pressure can be introduced within the cylinder 70, the piston rod can be extended pushing the lip 19 upwardly as opposed to using the flexible cable 54.

Turning now more specifically to FIGURE 4, it will be noted that rocker arm 30 shown therein carries at the left end thereof a cam means 76 in the form of a projecting abutment. It will be further noted that a valve means 78 is fixed on the frame. Such valve means, as particularly described in connection with FIGURE 7, is adapted to direct hydraulic fluid entering the same either to the cylinder 26 or to the cylinder 70. An operating arm 80 extends from the valve means 78. With the provision of the cam means and the valve means, the elevating and extending operation of the platform and lip, respectively, are selectively controlled.

In particular, as with the previously described embodiment, the operator initially activates a suitable control which causes fluid under pressure to be directed to the valve 78. In the normal position of the valve 78, it is set to direct fluid traveling thereto into the cylinder 26. Accordingly, when the operator initially activates the system, fluid under pressure is delivered to the cylinder 26, which in turn causes a forcing of the piston rod 28 outwardly or to the right as shown in the figures, and this causes a rotation counter-clockwise of the rocker arm 30. This counter-clockwise rotation of the rocker arm 30 results in lifting of the ramp member or platform 15 in exactly the same manner as described above.

Eventually, however, with this initial operation, the cam means in the form of abutment 76 moves into engagement with the operating arm 80 projecting from the valve means 78. This operative position is shown in FIGURE 5, and it will be noted that the same is reached when the platform 15 has assumed a first upper position elevated with respect to the horizontal. When the abutment 76 engages the operating arm 80 of the valve means, it presses the same inwardly due to the fact that the valve means 78 is of the spring biased type. With inward pressing of the operating arm 80, the valve means 78 is shifted so as to direct the fluid under pressure traveling there to into the T-coupling 82 connected to the inlet of the cylinder 70. The T-coupling 82 is incorporated so as to permit the use of a bleeder or metering valve 174 in association with the cylinder 70 so as to prevent excessive delivery of fluid under pressure to the cylinder 70. At this time, it is sufficient to understand that the valve means 78 causes a change of direction in fluid flow, namely, when the abutment 76 engages the operating arm 80, the fluid is directed from the cylinder 26 to the cylinder 70. Accordingly, as the ramp 15 reaches its first or upper position, the lip 19 is pushed upwardly or extended by virtue of the fact that the piston rod 72 moves outwardly of the cylinder 70. A suitable check valve 116, also described in connection with FIGURE 7, is provided to maintain the fluid under pressure temporarily in the cylinder 26.

When the lip has reached its extended position, the operator releases the check valve 116 thereby permitting the fluid under pressure in the cylinder 26 to drain therefrom. The platform therefore begins its descent. At this time, the lip 19, for reasons explained more fully below, also begins its descent, but at a slower rate. Ultimately, the lip 19 engages the vehicle bed, and the lip and ramp or platform 15 come into alignment thereby providing a continuous surface for loading or unloading of the vehicle. It should thus be apparent that aside from the use of a hydraulic means for moving the lip to its operative position, the general initial operation of the embodiment of FIGURES 4 through 6 is the same as with the embodiment of FIGURES 1 through 3. The important point to note is that with the latter embodiment, cam means are provided which move in response to movement of the piston 28 and which are engageable with the operating arm 80 to actuate the valve means to direct fluid flow from the cylinder 26 or first hydraulic means to the cylinder 70 or second hydraulic means when the platform has reached its first or upper position.

Consistent with the above description, and as indicated in the immediately preceding paragraph, the cylinders 26 and 70 and their associated mechanical components serve as operating means for moving the platform to its first upper position and the lip to its extended position. This operating means is such that after moving the components to such position, the same permits the platform and the lip to further move under gravitational force during the descent. Consistent with the instant embodiment of the present invention, not only is there an automatic control of fluid flow through the use of the cam means 76 and the valve means 78, but in addition, there is an automatic control for reset. More specifically, the instant embodiment incorporates control means for automatically energizing the operating means to move the platform upwardly toward the first position thereof when the platform has descended to its lowermost position and to a reset position where the lip is engageable with the support 24 upon descension of the platform. Thus, the operating means permits descension of the platform from the reset position whereby the lip assumes its vertical position and maintains the platform in horizontal cross traffic position.

With respect to the control means, it should be here noted that in the generic sense, such control means include the cam means 76 as well as the valve means 78. In addition, however, it will be noted that in the embodiment of FIGURES 4 through 6, a limit switch 100 is mounted on the ramp frame generally designated by the numeral 101. Such limit switch, as also explained more fully below, has two positions controlled by the arm 102 projecting from the switch body 100. When the arm 102 is in its upper position, it operates the valve means 78 to cause the same to direct fluid under pressure into the cylinder 26. When the switch 100 is in its off position, i.e. when the arm 102 thereof is in the downward position, then it serves, as also explained more fully below, to permit the valve 78 to operate whereby fluid can drain from the cylinder 26.

Let it be assumed for purposes of this explanation that the dock board assembly has been operated such that the lip 19 is in engagement with a vehicle load bed and in alignment with the ramp or platform 15 thereof. For example, let it be assumed that the dock board assembly of FIGURES 4 through 6 has been operated so that the platform and ramp thereof are in essentially the same position as the lip and ramp shown in FIGURE 3. Let it be further assumed that the vehicle in engagement with the lip 19 moves out from under the lip 19, thereby removing the support from such lip. In this instance, as with the previous embodiment, the ramp and lip begin a descent. Ultimately, the ramp and lip reach the position shown in FIGURE 6, i.e., the ramp in its lowermost position and the lip depending from the ramp on the front side of plate 59. At this time, in order to restore the ramp and lip to their normal cross traffic positions, it would be necessary to raise the platform upwardly so that the lower edge 22 of the lip 19 could clear the flange 58 and swing to a vertical position. Accordingly, projecting upwardly from the support 24, and specifically the upper surface 23 thereof, is an actuating means in the form of an actuating arm 104. Such arm is dimensioned such that it engages the arm 102 of the switch 100 when the platform assumes its lowermost position. The engagement of the arm 104 with the switch arm 102 causes the switch arm 102 to move to its upward position. Upon movement of the switch arm 102 to its upward position, fluid under pressure is directed by the valve means 78 into the cylinder 26 and as a result, the ramp or platform 15 is raised in substantially the same manner as it was raised initially.

To achieve the reset operation, it is desired that the raising of the platform cease once the platform has been elevated sufficiently to permit the lip 19 to assume a vertical position. Accordingly, consistent with this embodiment of the invention, the lip operating arm 49' carries a projecting abutment 106 extending downwardly therefrom. Such abutment is adapted to engage the switch arm 102 when the lip 19 assumes its vertical position and to cause the switch arm 102 to move into its downward position.

By virtue of the above construction, the switch arm 102 is moved upwardly when the platform reaches its lowermost position by engagement with the actuating arm 104. Then, as explained, the ramp begins to move upwardly, and when the ramp moves to an inclined position sufficiently above the horizontal so that the tip of the lip 22 of the ramp 15 is clear of the flange 58, the lip 19 swings inwardly to a vertical position, thus causing the projection 106 to engage the switch arm 102 and shift the switch arm 102 downwardly. Since in the raised position, the switch arm 102 operates the valve means 78 to feed fluid under pressure to the cylinder 26, the initial engagement of the arm 102 by the acuating arm 104 starts the recess cycle and the elevation of the platform 15. The second step of the re-cycle is started when the ramp has been elevated sufficiently to permit the lip 19 to swing vertically inward, whereupon the projection 106 engages switch arm 102 thereby moving the same downwardly. At this time, the valve means 78 is operated to permit the ramp or platform 15 to descend, and as a result the lower edge 22 of the lip 19 comes to rest on the support surface 23 of the support 24 whereby the platform 15 is maintained in its horizontal cross traffic position.

The above operation, and the details of the system providing the same, will be better understood by reference to FIGURE 7. In this figure, the cylinder 26, the cylinder 70, the operating or piston rod 28, the operating or piston rod 72, the operating arm 49', the lip 19, the T-connection 82 and the rocker arm 30 are illustrated schematically. Similarly, the position valve 78 is schematically shown with its actuating arm 80.

In addition to the above components, it will be noted that in FIGURE 7 there is a fluid reservoir 110 which feeds a pump 112 through a line 114. The pump 112 in turn feeds the position valve 78 through the line 118. The position valve 78 is coupled by the lines 170 and 171 with the cylinder 26 and by the line 172 with the line 170. In the line 171 feeding from the position valve 78 to the cylinder 26, there is the check valve 116 which is adapted to couple the line 170 to the reservoir 110 through the line 122. In fact, the normal position of the check valve is that which couples cylinder 26 with the reservoir 110 through lines 170 and 122.

The position valve 78 is a two-position valve, normally assuming a first position which couples the line 118 with the line 171, but operative in response to engagement of its operating arm 80 by the abutment 76 to couple the line 118 with the line 172.

The pump 112 and a solenoid 124 operative to shift the check valve 116 are coupled in parallel across a source of power generally designated by numeral 130. The line 132 leads to the pump 112 and a branch line 134 leads to the solenoid 124. The opposite electrical side of the pump and the opposite electrical side of the solenoid 124 are coupled by the leads 137 and 138, respectively, with the switch leads 140–142. The switch leads 140, 141 and 142 are electrically connected to respective switches 150 and 100 (each of the switches being adapted, when closed, to short circuit the line 140 to the line 142). With either of the switches 150 or 100 closed, the pump 112 and the check valve solenoid 124 are connected to the power source. Thus, as indicated, with either of the switches closed, fluid under pressure is delivered through the line 118 to the position valve 78 and the check valve 116 assumes a position where it couples the line 171 with the line 170 but shuts off communication between the line 170 and the line 122 leading back to the reservoir.

Now, let it be assumed initially that the dock board assembly has its components assuming the positions shown in FIGURE 4, and that an operator desires to move the ramp and lip to their operative position so as to be in engagement with a truck adjacent a loading platform. At such time, the operator closes the switch 150, thereby energizing the pump 112, and shifting the check valve 116 such that it directly connects the cylinder 26 with the position valve 78. Upon closing of the switch 150, the pump 112 delivers fluid under pressure through the line 118 and to the position valve 78. The position valve 78 is in its normal condition, and accordingly, the fluid under pressure passes through the position valve from the line 118 into the line 171 and then through the check valve 116 into the line 170 and in turn to the cylinder 26. This causes outward movement of the piston rod 28 and in turn counter-clockwise movement of the rocker arm 30. Counter-clockwise movement of the rocker arm 30 raises the ramp 15, as indicated in the preceding discussion, but of importance here, is the fact that the abutment 76 eventually comes into contact with the projecting operating arm 80 of the position valve 78. At such time, the ramp has been raised to its upper position, and by virtue of the engagement of the cam means or abutment 76 with the operating arm 80 of the position valve 78, the position valve 78 is shifted to its second position where it serves to direct fluid under pressure from the line 118 into the line 172. The shift in position of the valve 78 traps fluid under pressure in the cylinder 26, and the same cannot escape therefrom because the check valve solenoid 124 remains energized. Thus, fluid under pressure passes through the line 172 and the T-coupling 82 into the cylinder 70 thereby causing the piston therein to move to the left as shown. With movement of the piston within the cylinder 70 to the left, the piston rod 72 moves to the left thereby acting on the lip operating arm 49' and in the manner explained above, causing the lip 19 to pivot to its extended position. For convenience, and in order not to exceed the capacity of the cylinder 70, a parallel line 176 is coupled with the T-coupling 82, and such line leads to the flow control valve 174. Leading from the flow control valve 174 is the line 178 which returns to the reservoir. In essence, the lines 176 and 178 with the flow control valve 174 form a parallel path, and the flow control valve can be set to bleed as much fluid as desired through the T-coupling 82 thereby permitting only a limited quantity of fluid, depending on the relative setting of the flow control valve 174 to enter the cylinder 70. In this manner the rapidity with which the lip 19 is raised and lowered can be controlled.

To reiterate for a moment, after the position valve 78 has shifted to its second position, the fluid under pressure is delivered by the pump to the line 172, and this in turn causes the lip 19 to move to its extended position. During this time, the abutment 76 is in engagement with the operating arm 80 of the position valve 78.

Once the lip has reached its extended position following elevation of the ramp or platform 15, the operator can permit the dock board assembly or lip and platform components to descend by gravitational force so that the lip is in engagement with the truck or vehicle to be loaded or unloaded. By merely opening the switch 150, the operator de-energizes the pump 112, and simultaneously the check valve 116 is permitted to shift to its normal position where it couples the line 170 with the line 122, and in turn permits drain of fluid from the cylinder 26. With drain of fluid from the cylinder 26, the platform begins to descend, and with this descent, the abutment 76 moves out of engagement with the operating arm 80 of the position valve 78. Accordingly, the position valve shifts to its original position, thus disconnecting the line 172 from the pump. The lip 19 exerts some backward pressure through the piston rod 72 on the piston within the cylinder 70, and the lip also begins to descend, the descension being controlled by the rate of fluid return permitted by the flow control valve 174. Ultimately, during the initial setting operation, the lip comes into engagement with the vehicle to be loaded and unloaded, and essentially the components assume the same position as assumed by corresponding components in the embodiment of FIGURE 3.

It will be noted from the preceding discussion that the first and second hydraulic means including specifically the cylinders 26 and 70 serve to respectively raise the platform and the lip of the dock board. The position valve acting with the cam means, as explained, serves to control the fluid delivery to the respective cylinders in the proper sequence.

The further advantages, other than hydraulic actuation of the lip, achieved with the embodiment of FIGURES 4 through 6 can now be appreciated if attention is directed to the reset operation which is automatic with this embodiment.

Assume that the platform and lip were in their operating position, with the lip in engagement with a vehicle load bed to be loaded or unloaded. Components would then essentially be in the same position as shown in FIGURE 3, as stated above. If the vehicle were to pull away from the dock board, then the lip 19 would no longer be supported. The dock board and lip would descend, and ultimately would assume the position shown in FIGURE 6. As indicated above, with the descent, the actuating arm 104 engages the switch arm 102, and in turn closes the switch 100. Closing of the switch 100 causes exactly the same result as closing of the switch 150, namely, the pump 112 is energized and the check valve 116 is shifted, by virtue of energization of the solenoid 124, such that the line 170 is no longer connected with the line 122. Thus, closing of the switch 100 causes the pump to deliver fluid under pressure through the line 118 and the position valve 78 to the line 171 and the line 170 into the cylinder 26. It will be remembered that the position valve returned to its original position when the cam means or abutment 76 no longer engaged the operating arm 80. In essence, when the platform and lip reach the position shown in FIGURE 6 they started exactly the same operation which was started when the switch 150 was closed initially. Such operation continues, as also indicated above, until the dock board ramp 15 is elevated to a sufficient reset position to permit the lip 19 to assume a vertical disposition. At this time, the switch 100 is shut off by virtue of the engagement of the projection 106 with the switch arm 102, and then the ramp is permitted to descend because the pump is deenergized, and the line 170 leading from the cylinder 26 is again connected to the reservoir through line 122 by virtue of deenergization of the check valve solenoid 124.

While the construction of the various components included in the control means and operating means described above should be apparent to those of ordinary skill in the art, it is worthy to note that the switch 100 is of the type having an arm movable between two positions, but not requiring engagement of the arm to the full extent of its positions of movement. Specifically, when the switch arm is down, it is sufficient to engage the same to slightly urge it upwardly whereby it then springs to the upward position. Similarly, when the switch arm is disposed upwardly, it is sufficient to slightly engage the same to start it to swing downwardly, whereupon it springs to its downward position. This particular factor is important with the specific switching means shown because the projection 106 and the actuating arm 104 are disposed in the same vertical plane.

After reading the foregoing detailed description of illustrative and preferred embodiments of the invention, it should be apparent that the objects set forth at the outset of the present specification has been successfully achieved.

It will be obvious to those skilled in the art that various changes may be made in the invention, without departing from the spirit and scope thereof, and, therefore, the invention is not limited by that which is shown in the drawings and described in the specification, but only as indicated in the appended claims.

What is claimed is:

1. In a hydraulically operated dock board including a frame means, a ramp having one end pivotally attached to said frame means, a lip pivotally attached to the other end of said ramp, and mechanical linkage means disposed beneath said ramp and being operative to raise and lower said ramp, the improvement comprising:

a first cylinder and piston means mounted on said frame means and coupled to said mechanical linkage means for operation thereof;

a second cylinder and piston means mounted on the underside of said ramp and coupled to said lip for raising and lowering thereof;

a supply means adapted to supply a source of actuating fluid to said first and second cylinder and piston means;

a switch means controlling said supply means for selective operation thereof to thus selectively supply actuating fluid to said first and second cylinder and piston means;

control valve means for directing delivery of said actuating fluid to a selected cylinder and piston means; and operating means responsive to said mechanical linkage means for selectively actuating said control valve means and thus determining to which cylinder and piston means said actuating fluid will be delivered;

said switch means being actuatable to operate said supply means and thus supply actuating fluid from said source to said control valve means, which, when engaged by said operating means causes said ramp and said lip to raise;

said switch means also being deactuatable to terminate operation of said supply means and to interrupt the supply of actuating fluid from said source to said control valve means, which, when disengaged by said operating means, causes said ramp and said lip to lower.

2. The improvement defined in claim 1 wherein said actuating fluid is a liquid and wherein said supply means is a pump.

3. The improvement defined in claim 1 wherein said operating means includes a projection on said linkage means, which, when said linkage means is operated by said first cylinder and piston means, engages said control valve means.

4. The improvement defined in claim 1 wherein said control valve means is a two-position valve which, in one position, directs actuating fluid to said first cylinder and piston means and, in its other position, directs actuating fluid to said second cylinder and piston means.

5. The improvement defined in claim 1 wherein said switch means includes a manually operable switch.

6. The improvement defined in claim 1 wherein said switch means is a limit switch, and wherein engagement means are provided for said contacting and actuating said limit switch.

7. The improvement defined in claim 1 but further characterized by a metering valve coupled to said second cylinder and piston means to control the rate at which actuating fluid flows to and from said second cylinder and piston means and thus the rate at which said lip raises and lowers.

8. The improvement defined in claim 1 but further characterized by a check valve coupled to said first cylinder and piston means.

9. The improvement defined in claim 8 but further characterized by a solenoid disposed between said switch means and said check valve, said solenoid being operable by said switch means to move said check valve to thus permit actuating fluid to feed from said first cylinder and piston means and back to said source thereof.

References Cited by the Examiner

UNITED STATES PATENTS

| | | | |
|---|---|---|---|
| 2,689,965 | 9/54 | Fenton | 14—71 |
| 2,714,735 | 8/55 | Watson | 14—71 |
| 2,846,703 | 8/58 | Adley | 14—71 |
| 2,881,458 | 4/59 | Rodgers | 14—71 |
| 2,904,802 | 9/59 | Hartman | 14—71 |
| 3,117,332 | 1/64 | Kelley | 14—71 |
| 3,137,017 | 6/64 | Pfleger | 14—71 |

CHARLES E. O'CONNELL, *Primary Examiner.*

JACOB L. NACKENOFF, *Examiner.*